US011113276B2

(12) United States Patent
Zhao (10) Patent No.: US 11,113,276 B2
(45) Date of Patent: Sep. 7, 2021

(54) QUERYING A DATABASE

(71) Applicant: Advanced New Technologies Co., Ltd., George Town (KY)

(72) Inventor: Hang Zhao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 518 days.

(21) Appl. No.: 15/870,225

(22) Filed: Jan. 12, 2018

(65) Prior Publication Data

US 2018/0137169 A1 May 17, 2018

Related U.S. Application Data

(63) Continuation of application No. PCT/CN2016/090270, filed on Jul. 18, 2016.

(30) Foreign Application Priority Data

Jul. 27, 2015 (CN) .......................... 201510446726.2

(51) Int. Cl.
*G06F 16/2453* (2019.01)
*G06F 16/00* (2019.01)

(52) U.S. Cl.
CPC ........ *G06F 16/24535* (2019.01); *G06F 16/00* (2019.01); *G06F 16/24542* (2019.01)

(58) Field of Classification Search
CPC ...................... G06F 16/24535; G06F 16/24542
See application file for complete search history.

(56) References Cited

U.S. PATENT DOCUMENTS 6,226,745 B1 * 5/2001 Wiederhold ........ G06F 21/6218
707/999.009
2005/0033621 A1 * 2/2005 Hartmann .............. G06Q 10/02
705/5

(Continued)

FOREIGN PATENT DOCUMENTS

CN 102081624 6/2011
CN 102156714 8/2011

(Continued)

OTHER PUBLICATIONS

International Search Report issued by the International Searching Authority in International Application No. PCT/CN2016/090270 dated Sep. 26, 2016, 9 pages.

(Continued)

*Primary Examiner* — Amanda L Willis
(74) *Attorney, Agent, or Firm* — Fish & Richardson P.C.

(57) ABSTRACT

A query is received from a user. A query event type and a query time range associated with the query are determined. An estimated amount of data to be queried associated with the determined query time range is determined based on at least a historical number of the query event type of the user. An allowable amount of data to be queried supported by a database for a single query is determined. One or more sub-queries for the received query are generated. Each sub-query is associated with a different time period within the determined query time range. A corresponding amount of data to be queried associated with each time period is less than, or equal to, the determined allowable amount of data to be queried. The database is queried with the generated one or more sub-queries.

20 Claims, 5 Drawing Sheets

(56) References Cited

U.S. PATENT DOCUMENTS

| | | | |
|---|---|---|---|
| 2010/0088315 A1 | 4/2010 | Netz et al. | |
| 2011/0125730 A1* | 5/2011 | Bordawekar | G06F 16/24532 707/718 |
| 2011/0320586 A1* | 12/2011 | Maltz | G06F 11/3495 709/224 |
| 2014/0280034 A1* | 9/2014 | Harris | G06F 16/2453 707/718 |
| 2018/0121923 A1 | 5/2018 | Uhr et al. | |

FOREIGN PATENT DOCUMENTS

| | | |
|---|---|---|
| CN | 103294754 | 9/2013 |
| CN | 103412922 | 11/2013 |
| CN | 103838632 | 6/2014 |
| CN | 103942098 | 7/2014 |
| CN | 108009834 | 5/2018 |
| CN | 108038786 | 5/2018 |
| TW | M554608 | 1/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Preliminary Report on Patentability in International Application No. PCT/CN2016/090270, dated Jan. 30, 2018, 8 pages (with English Translation).

Written Opinion in International Application No. PCT/CN2016/090270, dated Sep. 26, 2019, 7 pages (with English Translation).

* cited by examiner

QUERYING A DATABASE

This application is a continuation of PCT Application No. PCT/CN2016/090270, filed on Jul. 18, 2016, which claims priority to Chinese Patent Application No. 201510446726.2, filed on Jul. 27, 2015, and each application is incorporated by reference in its entirety.

BACKGROUND

A user can query a database for information associated with an event. For a lightweight event log query, the amount of data to be queried is typically small. The database can quickly respond to the lightweight event log query without affecting normal operations of the database (for example, read and write operations). For a heavyweight event log query, the amount of data to be queried is typically large. The database may not be able to quickly respond to the heavy event log query without affecting normal operations of the database.

SUMMARY

The present disclosure describes querying a database.

In an implementation, a query is received from a user. A query event type and a query time range associated with the query are determined. An estimated amount of data to be queried associated with the determined query time range is determined based on at least a historical number of the query event type of the user. An allowable amount of data to be queried supported by a database for a single query is determined. One or more sub-queries for the received query are generated. Each sub-query is associated with a different time period within the determined query time range. A corresponding amount of data to be queried associated with each time period is less than, or equal to, the determined allowable amount of data to be queried. The database is queried with the generated one or more sub-queries.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach can be used to query a database. For example, a user wants to query a database that involves a large amount of data stored in the database. If the amount of data exceeds the capability of the database (for example, a maximum amount of data to be queried, supported by the database for a single query), the query can be split into multiple sub-queries. Each sub-query is associated with a corresponding amount of data to be queried. Each corresponding amount of data to be queried does not exceed the capability of the database. Instead of a query that involves a large amount of data stored in the database, multiple sub-queries are performed by the database (for example, one after another) to generate a response to the query. Second, the described approach can respond to a query that involves a large amount of data stored in a database without affecting normal operations of the database (for example, read and write operations). As a result, stability of the database can be improved. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes querying a database, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

When a user uses an Internet service (for example, network socializing, network transaction, or network entertainment) provided by a server, information associated with the Internet service usage can be stored in a database associated with the server. For example, each operational behavior of an external user or each operation processed by the server can be considered an event. Information associated with an event (for example, time or content) can be stored in the database (for example, as a log). The database can be queried to retrieve event-related data (for example, an event list, statistical analysis, and fault location. Additionally, the database can be queried (for example, by online transaction record queries and bank account change record queries) to retrieve other types of data associated with particular query types.

In general, a database has a limited processing capability (for example, a maximum allowable amount of data returnable with a single query). The processing capability is determined by, for example, a computer processor, memory, and data structure associated with a particular database. For a lightweight event query, the amount of data to be queried is typically smaller than the maximum allowable amount of data (for example, 10 transaction records in a month for a personal seller). The database can quickly respond to the lightweight event query without affecting normal operations of the database (for example, read and write operations). However, for a heavyweight event query, the amount of data to be queried is typically larger than the maximum allowable amount of data (for example, 10 million transaction records in a month for an E-commerce company). The database may not be able to quickly respond to the heavyweight event log query without affecting normal operations of the database. Additionally, responding to a heavyweight event query may decrease the stability of the database. Destabilizing the database can cause service disruptions and a non-optimal customer experience for end users.

At a high-level, the described approach provides a mechanism to query a database that involves a large amount of data stored in the database. To perform and complete a heavyweight event query, the heavyweight event query is split into multiple sub-queries. Each sub-query is associated with a corresponding amount of data to be queried, where each corresponding amount of data to be queried does not exceed the capability of the database. Instead of the heavyweight event query, the multiple sub-queries are performed by the database to generate an overall response to the heavyweight event query. By splitting the heavyweight event query into multiple sub-queries and querying the database with each of the multiple sub-queries, the database can respond to the heavyweight event query without affecting normal operations of the database. Additionally, stability of the database can be improved.

Figure 1:
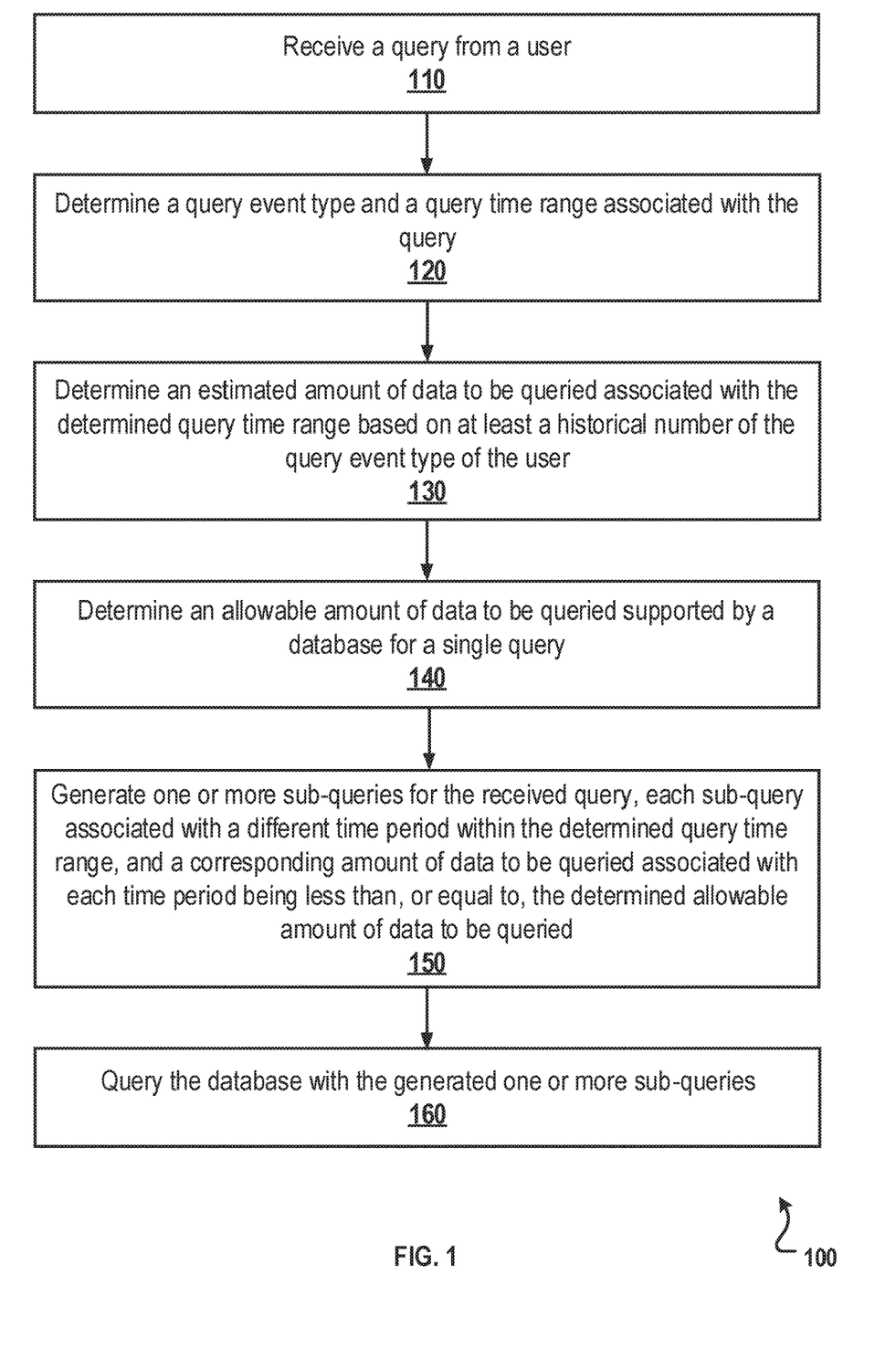
FIG. 1 is a flowchart illustrating an example of a computer-implemented method for querying a database, according to an implementation of the present disclosure.

FIG. 1 is a flowchart illustrating an example of a computer-implemented method 100 for querying a database, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 110, a query is received from a user. In some implementations, the user uses a terminal device to perform a query operation. In some implementations, the user can specify a query event type when performing the query operation. For example, in an online payment system, the user can specify the query event type to be a transaction record, a credit card payment record, a money transfer record, or a reward point redemption record. In some implementations, if the user does not specify the query event type, the query event type can be set to a default value (for example, all event types are queried). The user can specify a query time range when performing the query operation. In some implementations, the user can specify a start time T1 and an end time T2 for the query. In some implementations, the user can specify the query time range to be a year, a month, a week, a day, an hour, or a minute. In some implementations, if the user does not specify the query time range, the query time range can be set to a default value (for example, all records in the last month are queried). In some implementations, the query is received by an event record query device, as discussed in FIG. 2. From 110, method 100 proceeds to 120.

At 120, a query event type and a query time range associated with the query are determined. In some implementations, after receiving the query from the user, the event record query device, as discussed in FIG. 2, determines the query event type and the query time range from the received query. From 120, method 100 proceeds to 130.

At 130, an estimated amount of data to be queried associated with the determined query time range is determined based on at least a historical number of the query event type of the user. In some implementations, an amount of data to be queried associated with the determined query time range can be determined by directly accessing the database. Directly accessing the database occupies some processing capability of the database. In the present application, an amount of data to be queried associated with the determined query time range can be estimated based on a historical number of the query event type of the user, thereby avoiding mitigating use of the limited processing capability of the database. In some implementations, after the query event type is determined, a historical number of the query event type of the user within the determined query time range can be estimated based on the user's historical behavior. For example, assuming that a historical number of the query event type of a user is Cs within a fixed time period Ts, and a determined query time range with a [start time, end time] of [T1, T2], then the estimated historical number Ce of the query event type of the user within the time range [T1, T2] is $Ce=Cs \times (T2-T1)/Ts$.

In some implementations, specific statistical values are recorded, for example, by the event record query device in advance. In some implementations, the specific statistical values can be acquired in advance from the database or a backup database (for example, during an idle period of the database or the backup database), and stored, for example, at the event record query device. The specific statistical values can include statistical values in different historical time ranges (for example, last year or all valid historical). The specific statistical values can include statistical values in different fixed time periods (for example, a day, a week, or a month). The specific statistical values can include statistical values of different types (for example, an average number of an event type of a user in a fixed time period or a maximum number of an event type of a user in a fixed time period).

In some implementations, the fixed time period Ts is statically set. For example, the fixed time period Ts can be set to a month based on partition of the time. In some implementations, the fixed time period Ts is dynamically set. For example, the fixed time period Ts can be set to a time period having a length of 30 days. Statically setting the fixed time period is simple to implement, but not sensitive to sudden data change. Dynamically setting the fixed time period is sensitive to sudden data change, thereby further improving stability of the database. From 130, method 100 proceeds to 140.

At 140, an allowable amount of data to be queried, supported by a database for a single query, is determined. In some implementations, the allowable amount of data to be queried, supported by a database for a single query, is a maximum amount of data to be queried, currently supported by the database for a single query. In some implementations, the allowable amount of data to be queried, currently supported by the database for a single query, is determined by a hardware configuration (for example, CPU and memory) of the database, software configuration (for example, software execution efficiency, data structure, an amount of a single piece of data), current load of the database, or various combinations of the hardware configuration, the software configuration, and the current load of the database. In some implementations, the allowable amount of data to be queried, supported by a database for a single query, can be set to a fixed number. In some implementations, the allowable amount of data to be queried, supported by a database for a single query, can be estimated in real time. From 140, method 100 proceeds to 150.

At 150, one or more sub-queries are generated for the received query. In some implementations, the received query is split into one or more sub-queries based on at least the determined estimated amount of data to be queried associated with the determined query time range and the determined allowable amount of data to be queried, supported by a database for a single query. Each sub-query is associated with a different time period within the determined query time range. A corresponding amount of data to be queried, associated with each time period, is less than or equal to the determined allowable amount of data to be queried.

For example, the number of one or more sub-queries, N, is calculated by rounding up the value of Ce/Max, where Ce is the estimated historical number of the query event type of the user within the determined query time range [T1, T2], and Max is the allowable amount of data to be queried, supported by a database for a single query. Next, the determined query time range [T1, T2] is divided into N segments. Assuming $$\delta = \frac{1}{N} * (T2 - T1),$$

then the N segments are:

$$[T1 + 0*\delta, T1 + 1*\delta];$$
$$[T1 + 1*\delta, T1 + 2*\delta];$$
$$[T1 + 2*\delta, T1 + 3*\delta];$$
$$\ldots$$
$$[T1 + (N - 1)*\delta, T2].$$

A closed interval is used for each time range segment. In some implementations, a semi-closed interval can be used for each time range segment. In addition, since N is calculated by rounding up the value of Ce/Max, the right endpoint of the last segment is T2, instead of T1+N*δ. As a result, a length of the last segment is less than or equal to a length of each of other segments. In some implementations, other appropriate segmentation methods can be used to split the received query with the determined query time range into one or more sub-queries with corresponding time range segments. For example, a length of the first segment can be less than, or equal to, a length of each of other segments. In some implementations, N=1, where the determined estimated amount of data to be queried associated with the determined query time range does not exceed the allowable amount of data to be queried, supported by a database for a single query. In such a situation and in some implementations, the splitting of the received query is not performed. From 150, method 100 proceeds to 160.

At 160, the database is queried with the generated one or more sub-queries, instead of the received query. For example, the received query with a query time range [T1, T2] is split into N sub-queries. As a result, each sub-query does not exceed the limited processing capability of the database (for example, the allowable amount of data to be queried, supported by a database for a single query). In addition, the database can quickly respond to each sub-query, thereby avoiding a timeout for responding to the received query that involves a large amount of data stored in the database. After 160, method 100 stops.

Figure 2:
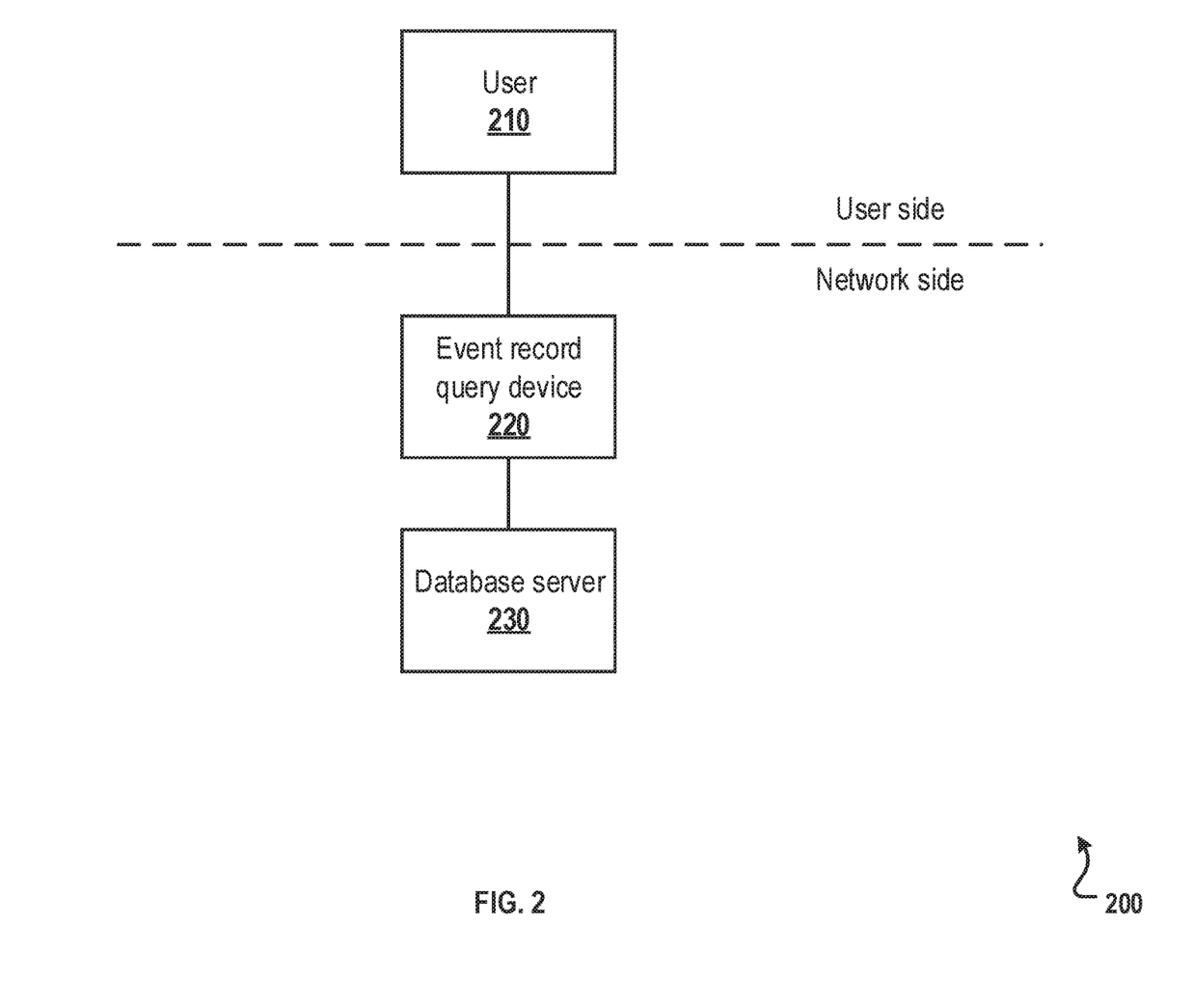
FIG. 2 is a block diagram illustrating an example of an event record querying system, according to an implementation of the present disclosure.

FIG. 2 is a block diagram illustrating an example of an event record querying system 200, according to an implementation of the present disclosure. For clarity of presentation, the description that follows generally describes system 200 in the context of the other figures in this description. System 200 can include user 210, an event record query device 220, and a database server 230. In some implementations, system 200 can include additional or different (or a combination of both) components not shown in the block diagram. In some implementations, components can also be omitted from system 200.

As illustrated in FIG. 2, the event record query device 220 is logically located between the user 210 and the database server 230. In some implementations, the event record query device 220 receives a query, requesting data from the database server 230, from the user 210, and returns the requested data to the user 210. The event record query device 220 is located on the network side of the event record querying system 200. In some implementations, the event record query device 220 can be located in the database server 230, or in an application server independent of the database server 230.

Figure 3:
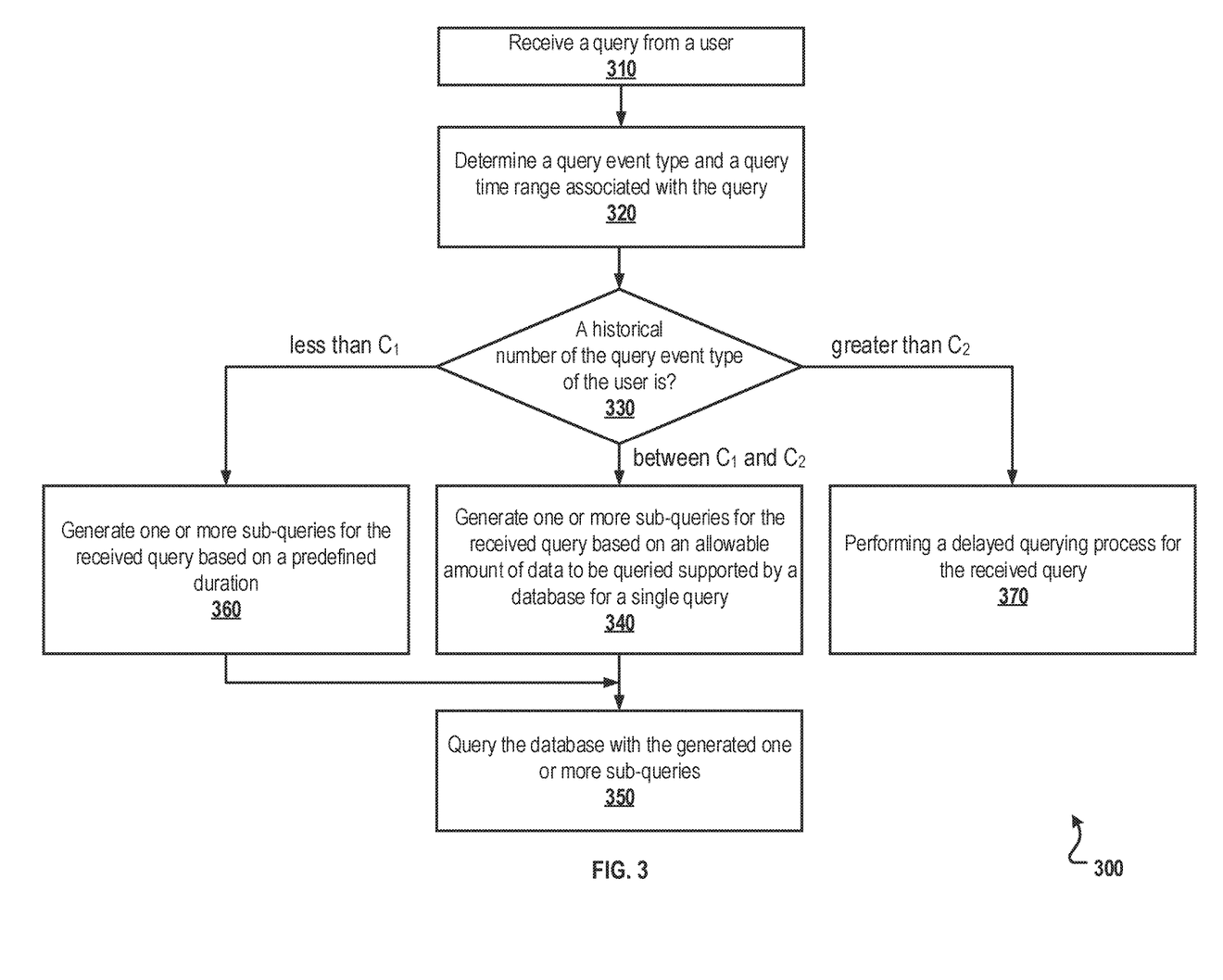
FIG. 3 is a flowchart illustrating another example of a computer-implemented method for querying a database, according to an implementation of the present disclosure.

FIG. 3 is a flowchart illustrating another example of a computer-implemented method 300 for querying a database, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 310, a query is received from a user. In some implementations, the user uses a terminal device to perform a query operation. In some implementations, the user can specify a query event type when performing the query operation. For example, in an online payment system, the user can specify the query event type to be a transaction record, a credit card payment record, a money transfer record, or a reward point redemption record. In some implementations, if the user does not specify the query event type, the query event type can be set to a default value (for example, all event types are queried). In some implementations, the user can specify a query time range when performing the query operation. In some implementations, the user can specify a start time T1 and an end time T2 for the query. In some implementations, the user can specify the query time range to be a year, a month, a week, a day, an hour, or a minute. In some implementations, if the user does not specify the query time range, the query time range is set to a default setting (for example, all records in the last month are queried). In some implementations, the query is received by an event record query device, as discussed in FIG. 2. From 310, method 300 proceeds to 320.

At 320, a query event type and a query time range associated with the query are determined. In some implementations, after receiving the query from the user, the event record query device, as discussed in FIG. 2, determines the query event type and the query time range from the received query. From 320, method 300 proceeds to 330.

At 330, a determination is made as to where a historical number of the query event type of the user is located regarding to two predefined thresholds (for example, $C_1 < C_2$). If it is determined that the historical number of the query event type of the user is greater than, or equal to, a first predefined threshold (for example, $C_1$) and is less than, or equal to, a second predefined threshold (for example, $C_2$), method 300 proceeds to 340. If it is determined that the historical number of the query event type of the user is less than the first predefined threshold (for example, $C_1$), method 300 proceeds to 360. If it is determined that the historical number of the query event type of the user is greater than the second predefined threshold (for example, $C_2$), method 300 proceeds to 370.

At 340, one or more sub-queries are generated for the received query based on an allowable amount of data to be queried, supported by a database for a single query. In some implementations, the allowable amount of data to be queried, supported by a database for a single query, is a maximum amount of data to be queried, supported by the database for a single query. In some implementations, the operations performed in 340 are equivalent or similar to the operations performed in 130-150, as discussed in FIG. 1. From 340, method 300 proceeds to 350.

At 350, the database is queried with the generated one or more sub-queries, instead of the received query. For example, the received query with a query time range [T1, T2] is split into N sub-queries. As a result, each sub-query does not exceed the limited processing capability of the database (for example, an allowable amount of data to be queried, supported by a database for a single query). In addition, the database can respond quickly to each sub-query, thereby avoid a timeout for responding to the received query that involves a large amount of data stored in the database. After 350, method 300 stops.

At 360, one or more sub-queries are generated for the received query based on a predefined duration. For example, for users having very low event occurrence frequency (for example, 10 transaction records in a month), the query can be split directly based on a predetermined rule, instead of dynamically calculating a splitting solution (for example, step 150, as discussed in FIG. 1). In some implementations, the query can be split based on, for example, a calendar month. In some implementations, the query is not split into multiple sub-queries (for example, N=1). From 340, method 300 proceeds to 350, as previously discussed. After 350, method 300 stops.

At 370, a delayed querying process is performed for the received query. For example, for users having very high event occurrence frequency (for example, 10 million transaction records in a month), the number of sub-queries may be very large after splitting the received query according to, for example, 340 as previously discussed. Therefore, a delayed querying process is performed for the received query instead of splitting the received query.

In some implementations, a delayed querying process does not respond to the received query immediately. For example, the received query can be placed in a waiting queue, and be processed when the database becomes idle. In some implementations, the processing of the received query can be delayed by several hours or longer. In some implementations, the received query is split into one or more sub-queries (for example, according to 340 or 360, as previously discussed) before performing the delayed querying process.

In some implementations, performing a delayed querying process includes querying a backup database associated with the database, instead of the database. Data stored in the backup database is periodically synchronized with data stored in the database. Since it is not required to immediately respond to the delayed querying process, the backup database can be queried after the completion of synchronization, thereby ensuring accuracy of queried data without affecting normal operations of the database. In some implementations, there are multiple backup databases for the single database. In such a situation and in some implementations, querying the multiple backup databases can be achieved in a MapReduce manner using a Hadoop cluster.

In some implementations, if a query response is not returned in time, a timeout occurs. For a delayed querying process, a special delayed response identifier is set to indicate that the received query does not need to be processed immediately, thereby avoiding that the application side regards the delayed query response as a timeout. In some implementations, the user is notified that the query response cannot be returned immediately, when to download the query response, or where to download the query response (for example, an Internet/Web or network address). In some implementations, after the query is completed, the query response can be sent to the user directly. In some implementations, the user is notified by an SMS message or an instant message. After 370, method 300 stops.

Figure 4:
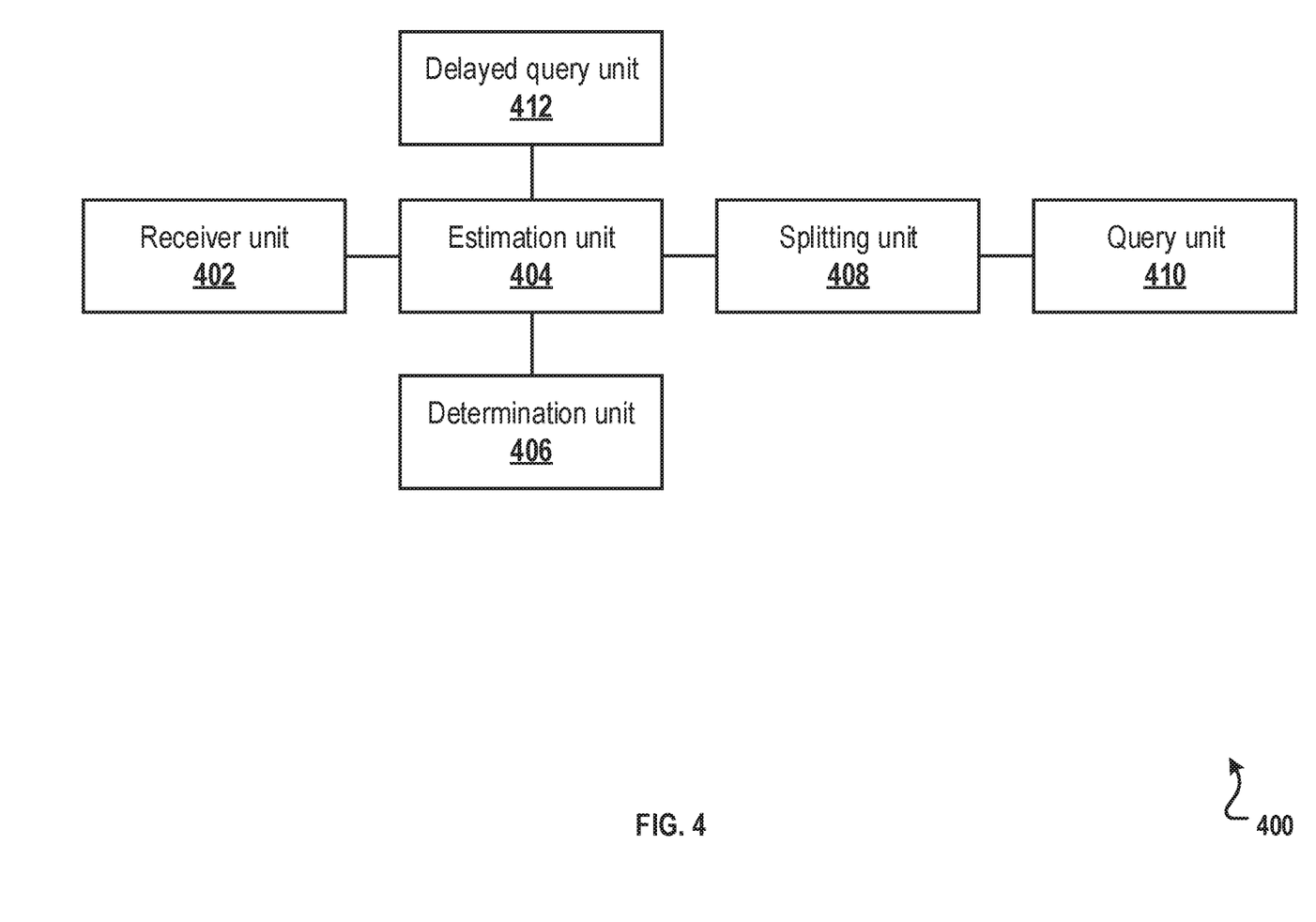
FIG. 4 is a block diagram illustrating an example of an event record querying device, according to an implementation of the present disclosure.

FIG. 4 is a block diagram illustrating an example of an event record querying device 400, according to an implementation of the present disclosure. For clarity of presentation, the description that follows generally describes device 400 in the context of the other figures in this description. The device 400 can include a receiver unit 402, an estimation unit 404, a determination unit 406, a splitting unit 408, a query unit 410, and a delayed query unit 412, which can be implemented in hardware, software, or both. In some implementations, the device 400 can include additional or different (or a combination of both) components not shown in the block diagram. In some implementations, components can also be omitted from the device 400.

The receiver unit 402 can, for example, receive a query from a user, as discussed in FIGS. 1 and 3. The estimation unit 404 can, for example, estimate an amount of data to be queried associated with a query time range, as discussed in FIG. 1. The determination unit 406 can, for example, determine an allowable amount of data to be queried, supported by a database for a single query, as discussed in FIG. 1. The splitting unit 408 can, for example, generate one or more sub-queries for the received query, as discussed in FIGS. 1 and 3. The query unit 410 can, for example, query a database, as discussed in FIGS. 1 and 3. The delayed query unit 412 can, for example, perform a delayed querying process, as discussed in FIG. 3.

Figure 5:
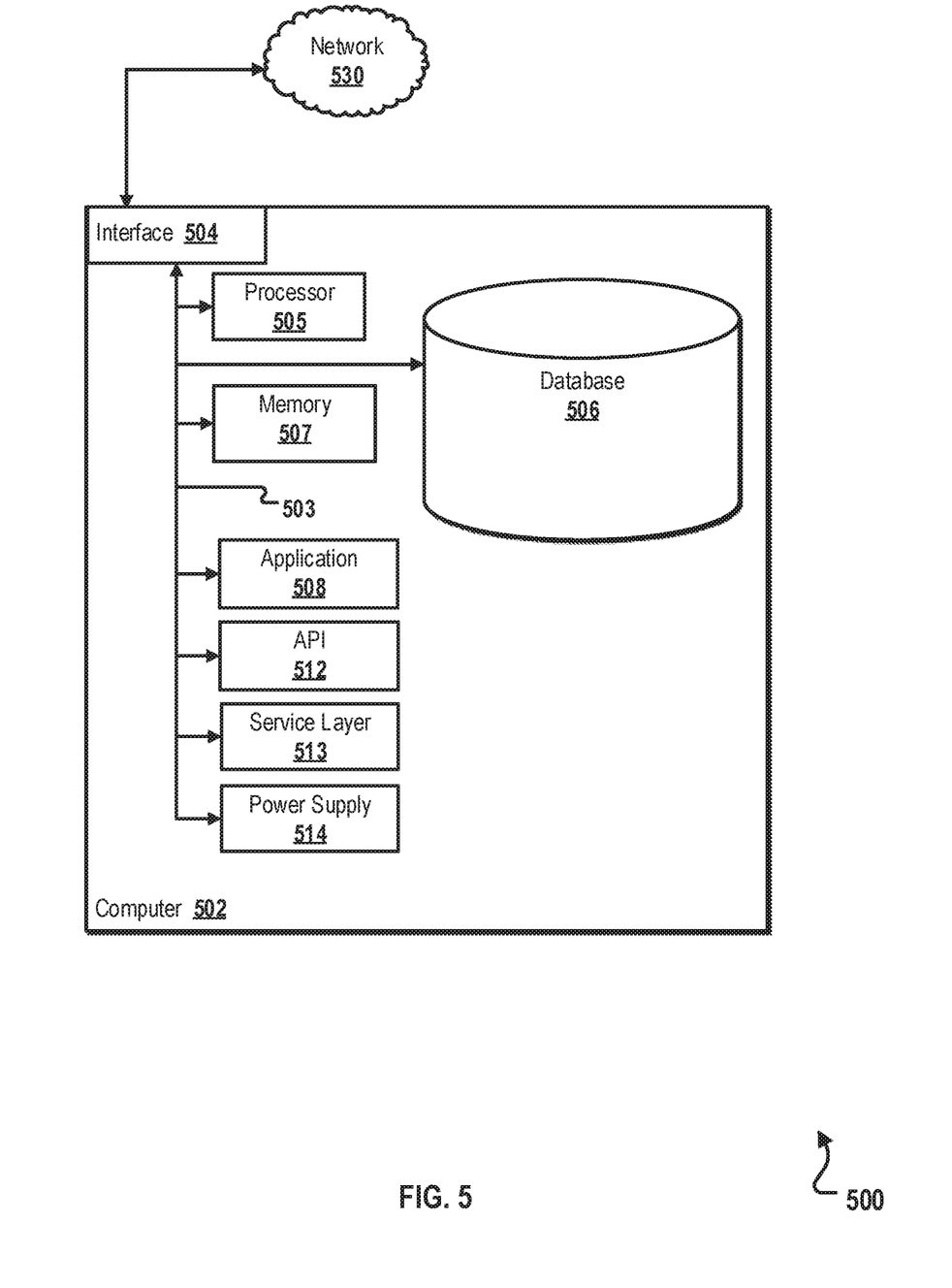
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 502 can include an input device, such as a keypad, keyboard, touch screen, another input device, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as a client, network component, a server, a database or another persistency, another role, or a combination of roles for performing the subject matter described in the present disclosure. The illustrated Computer 502 is communicably coupled with a Network 530. In some implementations, one or more components of the Computer 502 can be configured to operate within an environment, including cloud-computing-based, local, global, another environment, or a combination of environments.

At a high level, the Computer 502 is an electronic computing device operable to receive, transmit, process, store, or manage data and information associated with the described subject matter. According to some implementations, the Computer 502 can also include or be communicably coupled with a server, including an application server, e-mail server, web server, caching server, streaming data server, another server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory, conventional, or another type of database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprising: receiving a query from a user; determining a query event type and a query time range associated with the query; determining an estimated amount of data to be queried associated with the determined query time range based on at least a historical number of the query event type of the user; determining an allowable amount of data to be queried supported by a database for a single query; generating one or more sub-queries for the received query, wherein each sub-query is associated with a different time period within the determined query time range, and a corresponding amount of data to be queried associated with each time period is less than, or equal to, the determined allowable amount of data to be queried; and querying the database with the generated one or more sub-queries.

The foregoing and other described implementations can each, optionally, include one or more of the following features:

A first feature, combinable with any of the following features, wherein the historical number of the query event type of the user is an average number or a maximum number of the query event type of the user in a fixed time period.

A second feature, combinable with any of the previous or following features, wherein determining an estimated amount of data to be queried associated with the determined query time range based on at least a historical number of the query event type of the user comprises: determining whether the historical number of the query event type of the user is greater than, or equal to, a first predefined threshold and is less than, or equal to, a second predefined threshold; and in response to determining that the historical number of the query event type of the user is greater than, or equal to, a first predefined threshold and is less than, or equal to, a second predefined threshold, determining an estimated amount of data to be queried associated with the determined query time range.

A third feature, combinable with any of the previous or following features, further comprising: determining that the historical number of the query event type of the user is less than the first predefined threshold; and in response to determining that the historical number of the query event type of the user is less than the first predefined threshold, generating one or more sub-queries for the received query based on a predefined duration.

A fourth feature, combinable with any of the previous or following features, further comprising: determining that the historical number of the query event type of the user is greater than the second predefined threshold; and in response to determining that the historical number of the query event type of the user is greater than the second predefined threshold, performing a delayed querying process for the received query.

A fifth feature, combinable with any of the previous or following features, wherein performing a delayed querying process for the received query comprises querying a backup database associated with the database.

A sixth feature, combinable with any of the previous or following features, wherein performing a delayed querying process for the received query comprises setting a delayed response identifier for the query.

In a second implementation, a non-transitory, computer-readable medium storing one or more instructions executable by a computer system to perform operations comprising: receiving a query from a user; determining a query event type and a query time range associated with the query; determining an estimated amount of data to be queried associated with the determined query time range based on at least a historical number of the query event type of the user; determining an allowable amount of data to be queried supported by a database for a single query; generating one or more sub-queries for the received query, wherein each sub-query is associated with a different time period within the determined query time range, and a corresponding amount of data to be queried associated with each time period is less than, or equal to, the determined allowable amount of data to be queried; and querying the database with the generated one or more sub-queries.

The foregoing and other described implementations can each, optionally, include one or more of the following features:

A first feature, combinable with any of the following features, wherein the historical number of the query event type of the user is an average number or a maximum number of the query event type of the user in a fixed time period.

A second feature, combinable with any of the previous or following features, wherein determining an estimated amount of data to be queried associated with the determined query time range based on at least a historical number of the query event type of the user comprises: determining whether the historical number of the query event type of the user is greater than, or equal to, a first predefined threshold and is less than, or equal to, a second predefined threshold; and in response to determining that the historical number of the query event type of the user is greater than, or equal to, a first predefined threshold and is less than, or equal to, a second predefined threshold, determining an estimated amount of data to be queried associated with the determined query time range.

A third feature, combinable with any of the previous or following features, the operations further comprising: determining that the historical number of the query event type of the user is less than the first predefined threshold; and in response to determining that the historical number of the query event type of the user is less than the first predefined threshold, generating one or more sub-queries for the received query based on a predefined duration.

A fourth feature, combinable with any of the previous or following features, the operations further comprising: determining that the historical number of the query event type of the user is greater than the second predefined threshold; and in response to determining that the historical number of the query event type of the user is greater than the second predefined threshold, performing a delayed querying process for the received query.

A fifth feature, combinable with any of the previous or following features, wherein performing a delayed querying process for the received query comprises querying a backup database associated with the database.

A sixth feature, combinable with any of the previous or following features, wherein performing a delayed querying process for the received query comprises setting a delayed response identifier for the query.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a query from a user; determining a query event type and a query time range associated with the query; determining an estimated amount of data to be queried associated with the determined query time range based on at least a historical number of the query event type of the user; determining an allowable amount of data to be queried supported by a database for a single query; generating one or more sub-queries for the received query, wherein each sub-query is associated with a different time period within the determined query time range, and a corresponding amount of data to be queried associated with each time period is less than, or equal to, the determined allowable amount of data to be queried; and querying the database with the generated one or more sub-queries.

The foregoing and other described implementations can each, optionally, include one or more of the following features:

A first feature, combinable with any of the following features, wherein the historical number of the query event type of the user is an average number or a maximum number of the query event type of the user in a fixed time period.

A second feature, combinable with any of the previous or following features, wherein determining an estimated amount of data to be queried associated with the determined query time range based on at least a historical number of the query event type of the user comprises: determining whether the historical number of the query event type of the user is greater than, or equal to, a first predefined threshold and is less than, or equal to, a second predefined threshold; and in response to determining that the historical number of the query event type of the user is greater than, or equal to, a first predefined threshold and is less than, or equal to, a second predefined threshold, determining an estimated amount of data to be queried associated with the determined query time range.

A third feature, combinable with any of the previous or following features, the operations further comprising: determining that the historical number of the query event type of the user is less than the first predefined threshold; and in response to determining that the historical number of the query event type of the user is less than the first predefined threshold, generating one or more sub-queries for the received query based on a predefined duration.

A fourth feature, combinable with any of the previous or following features, the operations further comprising: determining that the historical number of the query event type of the user is greater than the second predefined threshold; and in response to determining that the historical number of the query event type of the user is greater than the second predefined threshold, performing a delayed querying process for the received query.

A fifth feature, combinable with any of the previous or following features, wherein performing a delayed querying process for the received query comprises querying a backup database associated with the database.

A sixth feature, combinable with any of the previous or following features, wherein performing a delayed querying process for the received query comprises setting a delayed response identifier for the query.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    receiving, as a received query, a query from a user;
    determining a query event type and a query time range associated with the query;
    determining an estimated amount of data to be queried associated with the query time range based on at least a historical number of the query event type of the user, wherein the historical number comprises a quantity of events of the query event type that occurred in a past time period, and wherein determining the estimated amount of data to be queried comprises:
        dividing the historical number by the past time period to determine an average number of the query event type of the user; and
        multiplying the average number of the query event type of the user and the query time range to determine the estimated amount of data to be queried;
    determining an allowable amount of data to be queried supported by a database for a single query;
    determining, based on the estimated amount of data to be queried and the allowable amount of data to be queried, a quantity N of one or more sub-queries to be generated;
    dividing the query time range into N time periods, wherein N−1 time periods of the N time periods have equal lengths of time;
    generating, as generated one or more sub-queries, the quantity N of one or more sub-queries for the received query, wherein each sub-query is used to query data in a different time period of the N time periods, and wherein a corresponding amount of data to be queried associated with each time period is less than, or equal to, the allowable amount of data to be queried; and querying the database with the generated one or more sub-queries.

2. The computer-implemented method of claim 1, wherein the historical number of the query event type of the user is an additional average number or a maximum number of the query event type of the user in a fixed time period.

3. The computer-implemented method of claim 1, wherein determining the estimated amount of data to be queried comprises:

determining whether the historical number of the query event type of the user is greater than, or equal to, a first predefined threshold and is less than, or equal to, a second predefined threshold; and in response to determining that the historical number of the query event type of the user is greater than, or equal to, the first predefined threshold and is less than, or equal to, the second predefined threshold, determining the estimated amount of data to be queried associated with the query time range.

4. The computer-implemented method of claim 3, further comprising:

determining that the historical number of the query event type of the user is less than the first predefined threshold; and in response to determining that the historical number of the query event type of the user is less than the first predefined threshold, generating one or more additional sub-queries for the received query based on a predefined duration.

5. The computer-implemented method of claim 3, further comprising:

determining that the historical number of the query event type of the user is greater than the second predefined threshold; and in response to determining that the historical number of the query event type of the user is greater than the second predefined threshold, performing a delayed querying process for the received query.

6. The computer-implemented method of claim 5, wherein performing the delayed querying process for the received query comprises querying a backup database associated with the database.

7. The computer-implemented method of claim 5, wherein performing the delayed querying process for the received query comprises setting a delayed response identifier for the query.

8. A non-transitory, computer-readable medium storing one or more instructions executable by a computer system to perform operations comprising:

receiving, as a received query, a query from a user;

determining a query event type and a query time range associated with the query;

determining an estimated amount of data to be queried associated with the query time range based on at least a historical number of the query event type of the user, wherein the historical number comprises a quantity of events of the query event type that occurred in a past time period, and wherein determining the estimated amount of data to be queried comprises:

dividing the historical number by the past time period to determine an average number of the query event type of the user; and multiplying the average number of the query event type of the user and the query time range to determine the estimated amount of data to be queried;

determining an allowable amount of data to be queried supported by a database for a single query;

determining, based on the estimated amount of data to be queried and the allowable amount of data to be queried, a quantity N of one or more sub-queries to be generated;

dividing the query time range into N time periods, wherein N−1 time periods of the N time periods have equal lengths of time;

generating, as generated one or more sub-queries, the quantity N of one or more sub-queries for the received query, wherein each sub-query is used to query data in a different time period of the N time periods, and wherein a corresponding amount of data to be queried associated with each time period is less than, or equal to, the allowable amount of data to be queried; and querying the database with the generated one or more sub-queries.

9. The non-transitory, computer-readable medium of claim 8, wherein the historical number of the query event type of the user is an additional average number or a maximum number of the query event type of the user in a fixed time period.

10. The non-transitory, computer-readable medium of claim 8, wherein determining the estimated amount of data to be queried comprises:

determining whether the historical number of the query event type of the user is greater than, or equal to, a first predefined threshold and is less than, or equal to, a second predefined threshold; and in response to determining that the historical number of the query event type of the user is greater than, or equal to, the first predefined threshold and is less than, or equal to, the second predefined threshold, determining the estimated amount of data to be queried associated with the query time range.

11. The non-transitory, computer-readable medium of claim 10, the operations further comprising:

determining that the historical number of the query event type of the user is less than the first predefined threshold; and in response to determining that the historical number of the query event type of the user is less than the first predefined threshold, generating one or more additional sub-queries for the received query based on a predefined duration.

12. The non-transitory, computer-readable medium of claim 10, the operations further comprising:

determining that the historical number of the query event type of the user is greater than the second predefined threshold; and in response to determining that the historical number of the query event type of the user is greater than the second predefined threshold, performing a delayed querying process for the received query.

13. The non-transitory, computer-readable medium of claim 12, wherein performing the delayed querying process for the received query comprises querying a backup database associated with the database.

14. The non-transitory, computer-readable medium of claim 12, wherein performing the delayed querying process for the received query comprises setting a delayed response identifier for the query.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  receiving, as a received query, a query from a user;
  determining a query event type and a query time range associated with the query;
  determining an estimated amount of data to be queried associated with the query time range based on at least a historical number of the query event type of the user, wherein the historical number comprises a quantity of events of the query event type that occurred in a past time period, and wherein determining the estimated amount of data to be queried comprises:
    dividing the historical number by the past time period to determine an average number of the query event type of the user; and
    multiplying the average number of the query event type of the user and the query time range to determine the estimated amount of data to be queried;
  determining an allowable amount of data to be queried supported by a database for a single query;
  determining, based on the estimated amount of data to be queried and the allowable amount of data to be queried, a quantity N of one or more sub-queries to be generated;
  dividing the query time range into N time periods, wherein N−1 time periods of the N time periods have equal lengths of time;
  generating, as generated one or more sub-queries, the quantity N of one or more sub-queries for the received query, wherein each sub-query is used to query data in a different time period of the N time periods, and wherein a corresponding amount of data to be queried associated with each time period is less than, or equal to, the allowable amount of data to be queried; and
  querying the database with the generated one or more sub-queries.

16. The computer-implemented system of claim 15, wherein the historical number of the query event type of the user is an additional average number or a maximum number of the query event type of the user in a fixed time period.

17. The computer-implemented system of claim 15, wherein determining the estimated amount of data to be queried comprises:
  determining whether the historical number of the query event type of the user is greater than, or equal to, a first predefined threshold and is less than, or equal to, a second predefined threshold; and
  in response to determining that the historical number of the query event type of the user is greater than, or equal to, the first predefined threshold and is less than, or equal to, the second predefined threshold, determining the estimated amount of data to be queried associated with the query time range.

18. The computer-implemented system of claim 17, the operations further comprising:
  determining that the historical number of the query event type of the user is less than the first predefined threshold; and
  in response to determining that the historical number of the query event type of the user is less than the first predefined threshold, generating one or more additional sub-queries for the received query based on a predefined duration.

19. The computer-implemented system of claim 17, the operations further comprising:
  determining that the historical number of the query event type of the user is greater than the second predefined threshold; and
  in response to determining that the historical number of the query event type of the user is greater than the second predefined threshold, performing a delayed querying process for the received query.

20. The computer-implemented system of claim 19, wherein performing the delayed querying process for the received query comprises querying a backup database associated with the database.

* * * * *